United States Patent Office 3,541,706
Patented Nov. 24, 1970

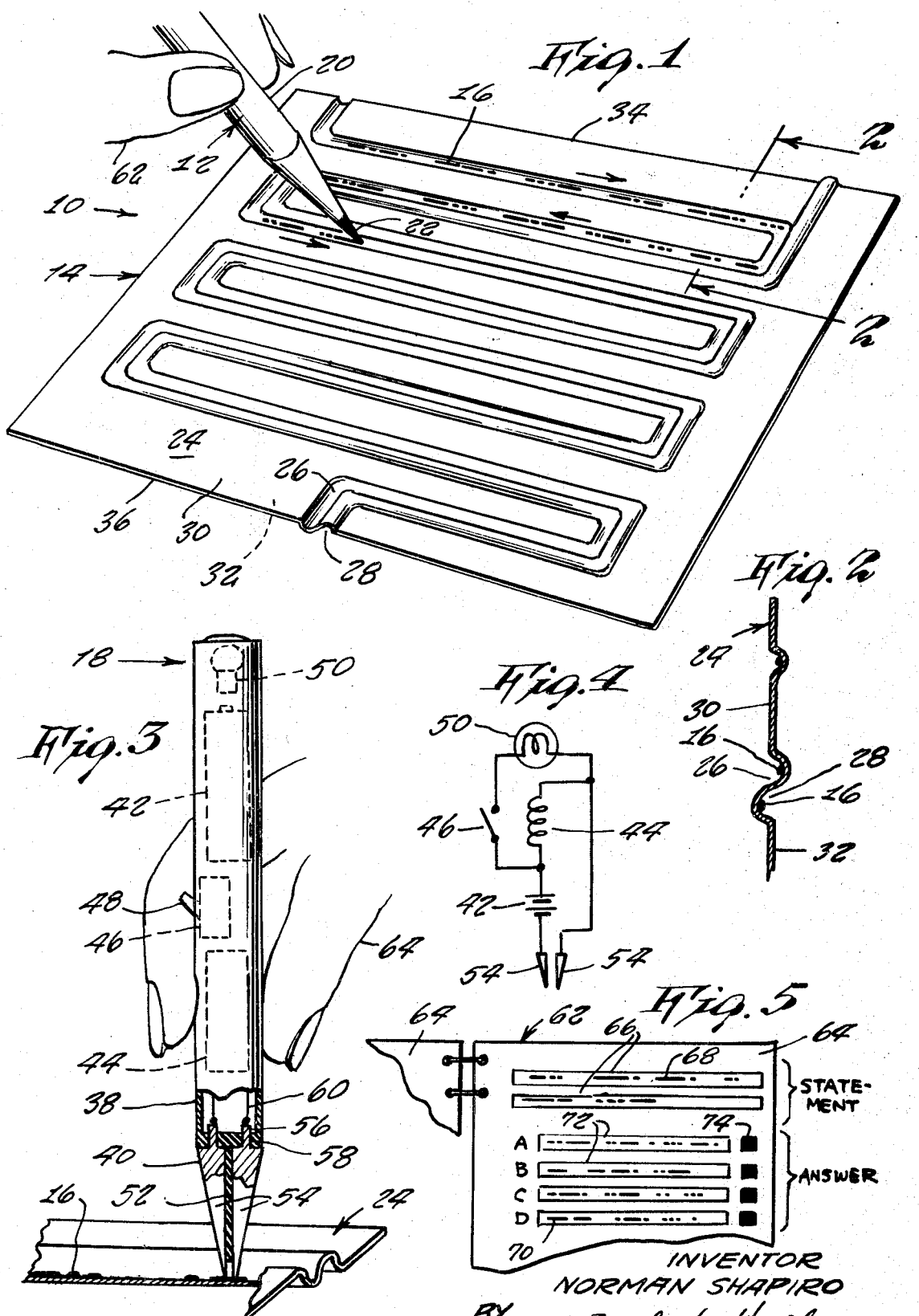

3,541,706
WRITING AND READING DEVICE FOR THE
BLIND AND METHOD OF USING THE SAME
Norman Shapiro, 47—15 212th St.,
Bayside, N.Y. 11361
Filed May 20, 1968, Ser. No. 730,390
Int. Cl. G06k 9/00; H04l 15/00
U.S. Cl. 35—38                                    1 Claim

ABSTRACT OF THE DISCLOSURE

A device offering a novel method of writing and reading by the blind, the device comprising a paper formed with a continuous groove on each side within which alphabetical symbols for representing a text may be made with an electric conductive graphite, the groove making an easy track to follow with a pencil incorporating the graphite and also serving as an easy track to follow by a blind reader with a sensory responsive tool that is electrically activated by the graphite symbols in the groove.

BACKGROUND OF THE INVENTION

This invention relates generally to writing and reading devices for blind persons.

A principal object of the present invention is to provide a novel device which offers an improved method for blind persons to write and read.

Another object is to provide a writing and reading method for the blind which is less expensive to use than the Braille method presently in general use.

Yet another object is to provide a device and method which will enable the blind to write to others and read mail sent to them, and take notes in classrooms and later to study the notes.

Yet a further object is to provide a device and method wherein reading material for the blind may be mass produced at lower cost than Braille.

Yet a further object is to provide a device and method wherein both sides of a paper may be used to carry text for the blind, thus making the present system particularly adaptable for the more lengthy textbooks.

Yet a further object is to provide a device and method which does not depend upon the sense of touch for being read by blind persons, but which provides a vibratory feeling of an instrument held in the hand, the length of the vibration periods being equivalent to the dot-dash system of a Morse or other code.

Yet a further object is to provide a device and method which eliminates the necessity of the more cumbersome instrument used to produce raised Braille, the present device comprising only a pencil held in the hand for following the groove in the paper, and the pencil having an electrically conductive graphite.

Other objects are to provide a writing and reading device, and method for the blind which is simple in design, inexpensive to manufacture, rugged in construction, easy to use and efficient in operation.

These and other objects will be readily evident upon a study of the following specification and the accompanying drawing wherein:

FIG. 1 is a perspective view showing a writing tool on a special paper, both of which comprise components of the present inevntion, FIG. 2 is a cross-sectional view taken on line 2—2 of FIG. 1, FIG. 3 is a side elevation view shown partly in cross-section and illustrating a reading tool which comprises another component of the present invention, shown in operative use, FIG. 4 is an electrical circuit of the reading tool, and FIG. 5 is a modified application of the invention to an instruction textbook.

Referring now to the drawing in detail, the reference numeral 10 represents a writing and reading device, and method for the blind according to the present invention, wherein there is a writing implement 12 for writing upon a specially formed paper 14, so as to produce a text 16 thereupon that can be read by use of a reading implement 18.

The writing implement 12 comprises a special pencil including a pencil casing 20 having a core 22 of electrically conductive graphite which can be transferred to the surface of a paper.

The paper 14 comprises a sheet 24 having a continuous groove 26 and 28 on each side 30 and 32, respectively, of the sheet. In order to make it possible to place a groove of maximum length on each side of the paper, the groove may be of serpentine, circular, zig zag, or other configuration, and which will not cross the groove upon the opposite side of the sheet. Preferably, as shown in FIG. 1, the groove on each side starts at the upper left hand of the page so as to harmonize with a conventional reading pattern, the groove then extending horizontally toward the right. The groove then courses slightly downward to a next horizontal line which at its opposite end courses slightly downward to a next horizontal line and so forth. The groove which had its start on the left hand upper edge 34 of the sheet, then terminates at a center of a lower edge 36. When the sheet is turned over, the groove on the rear side thus follows the same course without crossing the groove of the other side, which of course would stray a writer or reader.

The paper 14 may be made of any paper material that will retain the groove configurations formed therein and which will receive the electrically conductive graphite.

The reading implement 18 comprises a pencil configurated tool including a plastic hollow handle 38 removably secured to an interchangeable unit comprising a point 40. Within the handle, there is a dry cell battery 42, an electric coil 44, a manually controlled switch 46 having an exterior switch button 48, and a lamp 50. The point includes an electrically non-conductive mass 52 supporting a pair of spaced apart, downwardly extending contacts 54 which are provided with upwardly extending prongs 56 receivable within openings in the end of the handle, the prongs electrically contacting conductors 60 to form a circuit with the electrical components within the handle.

In operative use, to write a text upon the paper, the blind or other person 62 needs only to guide the writing implement 12 in the groove, starting at the upper left hand corner and writing a code in the groove bottom, as shown in FIG. 1. The continuous groove will prevent losing his place as he proceeds. To read the text, a blind person 64 need only to hold the reading implement 18 in his hand and guide the contacts 54 within the groove. Whenever the contact ends bridge a drawn dash or dot, an electrical circuit is thus closed causing the coil to vibrate. As the reader's hand proceeds at a constantly even pace across the paper, he may thus easily determine by the time length of the vibration, whether the graphite mark is a dash or dot, thus allowing him to decipher the code and understand the text, as shown in FIG. 3.

This invention could be readily adaptable for programmed learning. In FIG. 5, a modified application of the invention is made to a textbook 62 having papers 64 defining pages. As shown, the groove 66 may be made to contain text 68 made with electrically conductive graphite; the text comprising a statement of a problem. The student is then provided therebelow with several different answers thereto identified by texts 70 in different grooves 72, as shown at A, B, C, and D. The student is obliged to pick the correct answer among these. Instead of the student referring to the back portion of the book to see if his answer is correct, each answer would be provided with a blackened area 74 at its end, only the correct one of which would be printed with electrically conductive graphite or ink. This would make the programmed textbooks reusable because they would not be marked up. The correct response would be reinforced by utilizing the sense of feel in the vibrations.

The lamp 50 would be useful to persons partly blind in lieu of the vibrating coil, or to children not blind, who could employ the reading tool over printed games having hidden portions imprinted with electrically conductive ink.

While various changes may be made in the detail construction, it is understood that such changes will be within the spirit and scope of the present invention as is defined by the appended claim.

I claim:

1. In a writing and reading assembly for the blind, the combination of a writing implement for writing an electrically conductive text, a special paper for receiving a text writen by said writing implement, and a self-contained reading implement for reading said text on said paper, said writing implement including a casing of electrically conductive graphite which when transferred upon said paper, electrically activates said reading implement to allow a blind reader to read said text, said paper comprising a sheet with one continuous imperforate groove formed on one side of said sheet and another continuous groove on the other side thereof for receiving therein said electrically conductive graphite, each of said grooves serving as a track to guide said writing and said reading implements, said self-contained reading implement comprising a hollow plastic handle at one end of a removable point unit, said hollow handle containing a dry cell battery, an electric switch and coil, and an electric lamp externally visible, said point unit comprising a plastic member supporting a pair of spaced apart contacts in an electrical circuit with said battery, switch coil and lamp, said switch and lamp being in parallel electric circuit with said coil between said battery and said contacts, said paper being of rectangular configuration having opposite side edges and opposite upper and lower edges, said continuous groove on each side of said paper alternating with the continuous groove on the other side of said paper engaging said upper edge at the left corner, and engaging said lower edge at the center thereof, said groove being configurated into a plurality of horizontal parallel lines interconnected at their ends to form a zig-zag of said continuous groove.

References Cited

UNITED STATES PATENTS

| 1,149,547 | 8/1915 | Tideman | 178—87 |
| 2,525,837 | 10/1950 | Simplair. | |
| 2,724,910 | 11/1955 | Kelly | 35—9 |

WILLIAM H. GRIEB, Primary Examiner

U.S. Cl. X.R.

178—87